United States Patent [19]

Hitachi et al.

[11] Patent Number: 4,857,500

[45] Date of Patent: Aug. 15, 1989

[54] METHOD FOR MANUFACTURING THE METALLIC CARRIER BASE MATERIAL FOR MAINTAINING A CATALYST FOR EXHAUST GAS PURIFICATION

[75] Inventors: Yuzo Hitachi; Haruo Serizawa, both of Shizuoka, Japan

[73] Assignee: Usui Kokusai Sangyo Kabushiki Kaisha, Japan

[21] Appl. No.: 190,092

[22] Filed: May 4, 1988

[30] Foreign Application Priority Data

May 7, 1987 [JP] Japan ................... 62-109845

[51] Int. Cl.⁴ .............................. B01J 32/00
[52] U.S. Cl. .................... 502/439; 502/527
[58] Field of Search .................. 502/439, 527

[56] References Cited

U.S. PATENT DOCUMENTS

| | | | |
|---|---|---|---|
| 4,186,172 | 1/1980 | Scholz | 422/180 |
| 4,316,823 | 2/1982 | Bozon et al. | 252/465 |
| 4,381,590 | 5/1983 | Nonnenmann et al. | 29/157 R |
| 4,601,999 | 7/1986 | Retallick | 502/314 |
| 4,602,001 | 7/1986 | Cyron | 502/439 |
| 4,752,599 | 6/1988 | Nakamura et al. | 502/527 X |

*Primary Examiner*—W. J. Shine
*Attorney, Agent, or Firm*—Lowe, Price, Leblanc, Becker & Shur

[57] ABSTRACT

A method for manufacturing a metallic carrier base material of multi-layer structure, if desired accommodated in a cylindrical case, for maintaining a catalyst for exhaust gas purification, wherein a multi-layer body having a number of screen-like vent holes in an axial direction is formed by piling up alternatively the planar band material and corrugate band material made of thin steel strip, to furnish the contact portion, if desired, after inserting the multi-layer body into a cylindrical case. The multi-layer body or thus obtained composite is then treated by immersion processing in a molten aluminum bath.

24 Claims, 2 Drawing Sheets

METHOD FOR MANUFACTURING THE METALLIC CARRIER BASE MATERIAL FOR MAINTAINING A CATALYST FOR EXHAUST GAS PURIFICATION

BACKGROUND OF THE INVENTION

1. Field of the Invention

The present invention relates to a metallic carrier base material for maintaining the catalyst for exhaust gas purification to be used generally by mounting in the middle of an exhaust gas pipe as a means to purify exhaust gas of automobiles. Here, the "carrier base material" differs from the "carrier" as used in the field of chemistry; it means an implement used to maintain the catalyst supported by the carrier.

2. Description of Prior Art

In order to enlarge the carrier area per unit volume, i.e. to enlarge the effective contact area between the exhaust gas and the exhaust gas purification catalyst per unit volume, and to ensure the lightweight design for the metallic carrier base Material itself, the metallic carrier base material has conventionally consisted of a multi-layer body of spiral or hierarchical form with a number of screenlike vent holes which pass exhaust gas in a certain direction. Planar band materials and corrugated band materials, made of very thin heatresistant steel strips of less than 0.1 mm in thickness, are piled up alternatively to furnish the contact portion. The metallic carrier base material, composed of such multi-layer body material, is accommodated in a metal case with open ends when necessary. The bonding between the band materials themselves in the contact portion of the multi-layer body, or between the band material and the metal case, is performed by brazing, after the formation of the multi-layer body by electron beam welding or laser welding. This is described in the Japanese Provisional Patent Publication Nos. 54-13462, 57-1585, 56-4373, etc. Alternatively, the bonding is preformed by treating the band materials in advance with the brazing material of powdery or boil types.

As with the above-mentioned heat-resistant steel strip, for example, the heat-resistant steel of chrome-aluminum-ferrite type, containing chrome of 15–25 weight % and aluminum of 2–5 weight % is used, whereas the steel strip of this type is not very easily rolled, and the material cost is expensive, because it is necessary to pass it repeatedly through the process of rolling and annealing, until the thin material of the desired thickness, suitable for carrier base material, is obtained.

Also, as shown in the Japanese Provisional Patent Publication No. 62-11547, it is proposed to provide the layer coated with the substantially pure aluminum on a base metal of special composition, but such base metal is not easily available.

On the other hand, the conventional electron beam welding, or laser welding, requires special and expensive devices in the assembling and bonding to the multi-layer body. It is necessary to perform the troublesome and complicated operation such as spot welding at a narrow contact portion or an internal contact portion, and this results in lower productivity.

In the bonding method by brazing, special care has to be taken on the type and arrangement of brazing material or on the heating condition.

OBJECT OF THE INVENTION

The object of the present invention is to form a metallic carrier base material by using the specific steel strip for easier rolling such as the thin strip material, to reduce the production cost of such thin materials, and to offer the metallic carrier base material to maintain the catalyst for exhaust gas purification, whereby firm bonding is assured between the multi-layer band materials themselves, having heat-resistant properties and the resistance to high temperature corrosion, between the band material and the case.

SUMMARY OF THE INVENTION

In describing the advantageous features of the present invention, the first invention relates to the method for manufacturing a metallic carrier base material, for maintaining the catalyst, for exhaust gas purification by the multi-layer body. A multi-layer body with a number of screen-like vent holes in an axial direction is formed by alternatively piling up the planar band material and the corrugated band material, made of thin steel strips, to furnish the contact portion, and then by treating the said multi-layer body, by immersing it into a molten aluminum bath.

The second invention also relates to the method for manufacturing a metallic carrier base material to maintain the catalyst for exhaust gas purification, by the use of a multi-layer body. The multi-layer body having a number of screen-like vent holes in an axial direction is formed by alternatively piling up the planar band materials and the corrugated band materials made of thin steel strips, to furnish the contact portion, and by immersing it into a molten aluminum bath after the multi-layer body is accommodated in a cylindrical metal case.

The above-mentioned objects and advantages of the present invention will be more clearly understood when considered in conjunction with the accompanying drawings.

Figure 1:
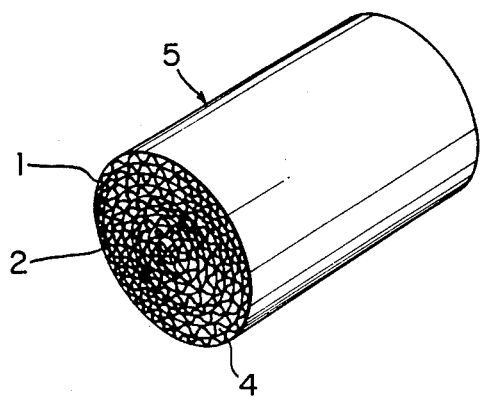
FIG. 1 is a perspective view of the metallic carrier base material of multi-layer structure according to an embodiment of this invention.
Figure 2:
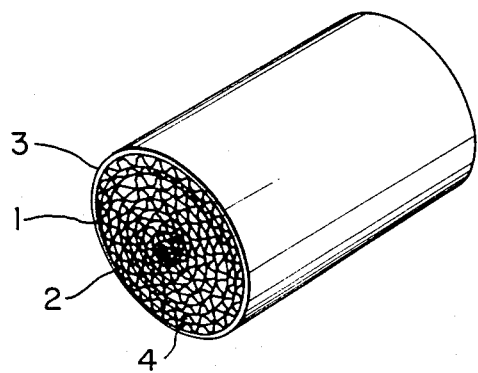
FIG. 2 represents a perspective view of the metallic carrier base material, when it is housed in a metal case.
Figure 3:
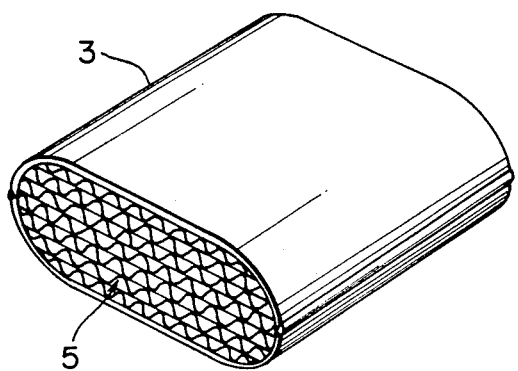
FIG. 3 is a perspective view of the metallic carrier base material of multi-layer structure, according to another embodiment of the invention when it is housed in a metal case.

The multi-layer structures in FIG. 1 and FIG. 2 are fabricated in spiral form, whereas the multi-layer structure in FIG. 3 is fabricated in hierarchical manner.

Figure 4:
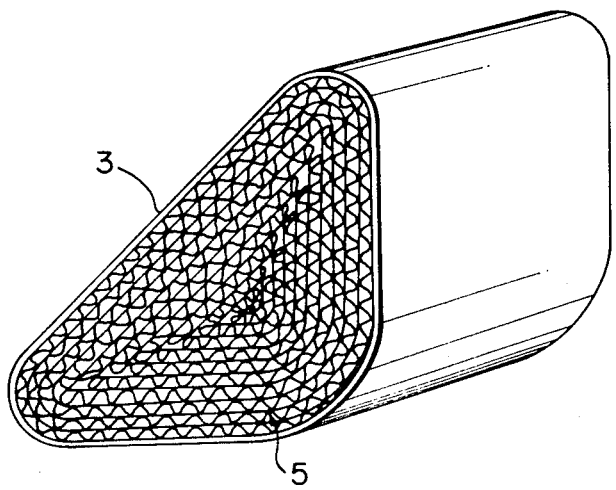

FIG. 4 shows a perspective view of the metallic carrier base material of multi-layer structure according to still another embodiment of the invention when it is housed in a metal case, whose cross-section has the form of a triangle. In general, the catalytic converter for automotive exhaust gas is mounted in the underfloor tunnel of an automobile. Such an underfloor tunnel is usually shaped in the form of a triangle or a trapezoid, to reduce the protuberance of the floor in the compartment, and the case with triangular form as shown in FIG. 4 is well suited to the complicated shape of such a tunnel. Consequently, it is possible in such a case to effectively utilize the space of the tunnel.

It should be understood that the shape of the metallic carrier base material, according to the present inven-

DETAILED DESCRIPTION OF THE PREFERRED EMBODIMENT (Thin Steel Strip)

The planar band material made of thin steel strip used in the present invention is fabricated from the heat-resistant steel plate materials and quenched foils, made of low carbon steel, containing carbon of up to 0.15 weight %, or of chrome steel, containing carbon of up to 0.15 weight % and chrome of 0.15–30 weight %, by fabricating the material through hot and cold rolling to reduce its thickness to about 0.03–0.1 mm.

The corrugated band material used in the present invention is fabricated by passing the band material between the forming gears.

(Manufacturing Method)

The planar band material (1) and the corrugated band material (2) thus fabricated, are piled up alternatively and wound up in spiral form, and a multi-layer body (5) having a number of screen-like vent holes (4) in an axial direction is formed. The multi-layer body (5) may be fabricated by cutting the band materials (1) and (2) into a certain length and by piling them up alternatively in hierarchical form.

The multi-layer body (5) thus fabricated, is to be the metallic carrier base material to maintain the catalyst for exhaust gas purification. The multi-layer body (5), i.e. the metallic carrier base material to maintain the catalyst for exhaust gas purification, may be fixed by spot welding when necessary and may be housed in a cylindrical metal case (3) with open ends.

(Molten Aluminum Bath)

The multi-layer body (5) is treated with defatting and pickling processes in advance, and it is immersed into the molten aluminum bath promptly after flux treatment. After taking it up from the bath, excessive aluminum is removed from the multi-layer body (5) by air blasting, and it is then washed with hot water.

The immersion process in the molten aluminum bath is generally performed with a bath temperature of about 700°–800° C. for a period of about 60 seconds. More favorably, the bath temperature should be about 720°–760° C., and the process time should be within 30 seconds.

In the immersion process of the multilayer body (5) in the molten aluminum bath, the aluminum coating layer is formed on the front and back surfaces of the band materials (1) and (2), which compose the multi-layer body. At the same time, aluminum is diffused into the iron base by the heating during the immersion process, and the intermetallic compound is formed.

The formation of this iron-aluminum alloy layer is very important in its property to increase the heat-resistant property and the resistance to high temperature corrosion of the metallic carrier base material.

Further, the contact portions between the band materials (1) and (2) are firmly bonded together by the immersion process of the multi-layer body (5) in the molten aluminum bath. As described above, this phenomenon is caused not only by the bonding between aluminum layers formed on the surface of the band materials, but also by the iron-aluminum alloy layer formed by the immersion process in the molten aluminum bath, and further still by the chromealuminum alloy layer formed by the alloying of chrome in the band material.

According to the present invention, the said iron-aluminum alloy layer is secondarily diffused by subsequently heating it in the atmospheric gas of a reductive or non-oxidizing nature, in a vacuum or in a salt bath when necessary, in order to expand the said alloy layer to the interior. It is possible to improve the heat-resisting property and the resistance to high temperature corrosion of metallic carrier base material.

The metallic carrier base material, in order to maintain the catalyst for exhaust gas purification according to the present invention, is manufacuted, as described above, by the immersion processing of the multi-layer body (5) in the molten aluminum bath. The immersion processing may be performed not only on the multi-layer body (5) itself, but also on the multi-layer body (5) housed in a cylindrical metal case (3).

In this case, the contact portion between the band materials of the multi-layer body (5) and the contact portion between the multi-layer body (5) and the metal case (3), are to be firmly bonded together between aluminum layers themselves and between the iron-aluminum alloy layers themselves.

In the following, the invention will be described in detail in conjunction with the examples, but it should be understood that the present invention is not limited to the exact details of such examples.

EXAMPLE 1

A planar band material consisting of thin steel strip of 0.05 mm in thickness and 74.5 mm in width, made of low carbon steel (Japanese Industrial Standards (JIS) G3141 SPCC), and the corrugated band material, fabricated from the band material by passing between the forming gears and fabricated in corrugated form, having the pitch of 5.0 mm between crests in longitudinal directin and the crest height of 2.5 mm, were piled up alternatively, wound up in spiral form, and fixed by spot welding at major points. Thus, a multi-layer body having an umber of screen-like vent holes in axial direction and an outer diameter of 70 mm was formed.

This multi-layer body was treated with a defatting and pickling process and was further immersed in the mixed molten salt bath, consisting of lithium chloride, potassium chloride, sodium chloride and sodium fluoride, to perform flux processing. Then, it was immersed into the molten bath of aluminum at 740° C. for 15 seconds. Excessive aluminum was then removed by air blasting and then the body was washed with hot water, and the metallic carrier base material having a heat-resistant and anti-corrosive coating layer was obtained.

EXAMPLE 2

The planar band material, consisting of thin steel strips of 0.04 mm in thickness and 38 mm in width, made of chrome steel (JIS G4305 SUS410L) (chrome 13%), and the corrugated band material, which was fabricated by passing the band material between the forming gears and fabricating it in corrugated form, having a pitch of 3.5 mm between crests in longitudinal direction and a crest height of 1.8 mm, formed into a multi-layer body of spiral form as described in the embodiment 1. Further, this metallic carrier base material of multi-layer structure was placed in a cylindrical case, with inner diameter of about 70 mm. It was treated with the immersion process in the molten aluminum bath for 12 seconds, as described in the embodiment 1. Thus, a metallic carrier base material having a heat-resistant and anti-corrosive coating layer on the surface was obtained.

(Evaluation of Performance Characteristics)

The powder of activated alumina (gamma alumina) and the slurry, with blended alumina sol, were coated on the surface of the vent holes of the metallic carrier base material as obtained in the embodiment 1, and on the surface of the vent holes of the metallic carrier base material as obtained in the embodiment 2, and these were heated to 600° C., and the catalyst carrier layer was adhered to the surface of the vent holes of the metallic carrier base material. The specimens thus obtained were subjected to the test by performing 50 cycles of quick heating and quick cooling, between normal temperature and 700° C. and by applying vibration. As a result, neither cracking nor detachment were observed on the joining portion and the coated layer of the specimens. This test proved that the metallic carrier base material according to the invention, has excellent heat-resistantant shockproof properties.

Effects of the Invention

Since the band materials used in the metallic carrier base material of the present invention consist of steel strips of low carbon steel or chrome steel, the material can be easily rolled and is also available at relatively low cost.

On the surface of the band material, which constitutes the metallic carrier base material of the present invention, aluminum is diffused and coated by the immersion process in the molten aluminum bath. At the same time, the alloy layers containing aluminum alloys such as iron-aluminum intermetallic compound are formed. These coating layers provide excellent heat-resistant properties and the resistance to high temperature corrosion. The contact portion between the multi-layer band materials themselves or between band material and the metal case are firmly bonded together by such a coating alloy layer. Accordingly, the welding or brazing processing required otherwise, can be eliminated.

What is claimed is:

1. A method for manufacturing a metallic carrier base material having a multi-layer structure for use in maintaining a catalyst for exhaust gas purification, comprising assembling alternate layers of a planar band material made of a thin steel strip and a corrugated band material made of a thin steel strip to form a multi-layer body having a plurality of screen-like vent holes in an axial direction, said multi-layer body serving as a contact portion, and immersion treating the multi-layer body in a molten aluminum bath.

2. A method for manufacturing a metallic carrier base material having a multi-layer structure for use in maintaining a catalyst for exhaust gas purification as set forth in claim 1, wherein the thin steel strips are made of low carbon steel or chrome steel.

3. A method as set forth in claim 2, wherein the low carbon steel contains up to 0.15 weight percent carbon.

4. A method as set forth in claim 2, wherein the chrome steel contains up to 0.15 weight percent carbon and 0.15-30 weight percent chrome.

5. A method as set forth in claim 1, wherein the thickness of the thin steel strips is about 0.03 to 0.1 mm.

6. A method as set forth in claim 1, wherein the multi-layer body is assembled in a bundled spiral form.

7. A method as set forth in claim 1, wherein the multi-layer body is assembled in hierarchical form.

8. A method as set forth in claim 1, wherein contacting portions of the planar band material and the corrugated band material are bonded by spot welding.

9. A method for manufacturing a metallic carrier base material having a multi-layer structure for use in maintaining a catalyst for exhaust gas purification as set forth in claim 1, wherein the immersion processing in the molten aluminum bath is performed with a bath temperature of 700°-800° C.

10. A method for manufacturing a metallic carrier base material having a multi-layer structure for use in maintaining a catalyst for exhaust gas purification as set forth in claim 1, wherein the immersion processing in the molten aluminum bath is performed within about 30 seconds.

11. A method for manufacturing a metallic carrier base material having a multi-layer structure for use in maintaining a catalyst for exhaust gas purification as set forth in claim 1, wherein the immersion processing in the molten aluminum bath is performed within about 30 seconds at a temperature of about 720°-760° C.

12. A method as set forth in claim 1, wherein after the multi-layer body is treated by immersion in the molten aluminum bath, excessive aluminum is removed by air blasting, and the resulting body is washed with hot water.

13. A method for manufacturing a metallic carrier base material having a multi-layer structure for use in maintaining a catalyst for exhaust gas purification, comprising assembling alternate layers of a planar band material made of a thin steel strip and a corrugated band material made of a thin steel strip to form a multi-layer body having a plurality of screen-like vent holes in an axial direction, said multi-layer body serving as a contact portion, providing the resulting multi-layer body in a cylindrical metal case, and immersion treating the encased multi-layer body in a molten aluminum bath.

14. A method for manufacturing a metallic carrier base material having a multi-layer structure as set forth in claim 13, wherein the thin steel strips are made of low carbon steel or chrome steel.

15. A method as set forth in claim 14, wherein the low carbon steel contains up to 0.15 weight percent carbon.

16. A method as set forth in claim 14, wherein the chrome steel contains up to 0.15 weight percent carbon and 0.15-30 weight percent chrome.

17. A method as set forth in claim 13, wherein the thickness of the thin steel strips is about 0.03 to 0.1 mm.

18. A method as set forth in claim 13, wherein the multi-layer body is assembled in a bundled spiral form.

19. A method as set forth in claim 13, wherein the multi-layer body is assembled in hierarchical form.

20. A method as set forth in claim 13, wherein contacting portions of the planar band material and the corrugated band material are bonded by spot welding.

21. A method for manufacturing a metallic carrier base material having a multi-layer structure for use in maintaining a catalyst for exhaust gas purification as set forth in claim 13, wherein the immersion processing in the molten aluminum bath is performed with a bath temperature of 700°-800° C.

22. A method for manufacturing a metallic carrier base material having a multi-layer structure for maintaining a catalyst for exhaust gas purification as set forth in claim 13, wherein the immersion processing in the molten aluminum bath is performed within 60 seconds.

23. A method for manufacturing a metallic carrier base material having a multi-layer structure as set forth in claim 13, wherein the immersion processing in the molten aluminum bath is performed at a temperature of about 720°-760° C. within about 30 seconds.

24. A method as set forth in claim 13, wherein after the multi-layer body is treated by the immersion processing in the molten aluminum bath, excessive aluminum is removed by air blasting, and then the resulting body is washed with hot water.

* * * * *